(12) United States Patent
Tarkkala

(10) Patent No.: US 7,933,583 B2
(45) Date of Patent: Apr. 26, 2011

(54) METHOD AND APPARATUS FOR DIGITAL IMAGE PROCESSING OF AN IMAGE FROM AN IMAGE SENSOR

(75) Inventor: Lauri Tarkkala, Espoo (FI)

(73) Assignee: Nokia Corporation, Espoo (FI)

( * ) Notice: Subject to any disclaimer, the term of this patent is extended or adjusted under 35 U.S.C. 154(b) by 566 days.

(21) Appl. No.: 11/117,661

(22) Filed: Apr. 27, 2005

(65) Prior Publication Data

US 2006/0246872 A1    Nov. 2, 2006

(51) Int. Cl.
*H04M 1/66* (2006.01)

(52) U.S. Cl. ........ 455/411; 455/410; 455/466; 455/558; 380/247

(58) Field of Classification Search .......... 455/410–411, 455/558, 557, 418–420, 550.1, 466
See application file for complete search history.

(56) References Cited

U.S. PATENT DOCUMENTS

| | | | | |
|---|---|---|---|---|
| 5,485,505 A | * | 1/1996 | Norman et al. | 455/419 |
| 5,517,554 A | * | 5/1996 | Mitchell et al. | 455/411 |
| 6,141,544 A | * | 10/2000 | Corriveau et al. | 455/419 |
| 6,321,079 B1 | * | 11/2001 | Cooper | 455/411 |
| 6,622,017 B1 | * | 9/2003 | Hoffman | 455/419 |
| 6,753,789 B1 | * | 6/2004 | Batra et al. | 340/825.69 |
| 7,088,988 B2 | * | 8/2006 | Kelkar et al. | 455/411 |
| 7,257,374 B1 | * | 8/2007 | Creigh | 455/41.2 |
| 7,389,123 B2 | * | 6/2008 | Rydgren et al. | 455/550.1 |
| 7,496,355 B2 | * | 2/2009 | Nielsen et al. | 455/414.2 |
| 7,499,699 B2 | * | 3/2009 | Rodriguez et al. | 455/420 |
| 7,565,141 B2 | * | 7/2009 | Macaluso | 455/419 |
| 7,603,105 B2 | * | 10/2009 | Bocking et al. | 455/411 |
| 2004/0043788 A1 | * | 3/2004 | Mittal | 455/558 |
| 2004/0192388 A1 | * | 9/2004 | Dupuis et al. | 455/558 |
| 2005/0154935 A1 | * | 7/2005 | Jin | 713/324 |
| 2006/0246872 A1 | * | 11/2006 | Tarkkala | 455/411 |
| 2007/0072641 A1 | * | 3/2007 | Willey | 455/550.1 |

FOREIGN PATENT DOCUMENTS

| | | |
|---|---|---|
| DE | 10128948 | 1/2003 |
| EP | 0685972 | 12/1995 |
| EP | 0998155 | 5/2000 |
| EP | 1213932 | 6/2002 |
| JP | 2001-209311 | 8/2001 |
| JP | 2005-102316 | 4/2005 |
| WO | WO 03/088699 | 10/2003 |
| WO | WO 2006/024599 | 3/2006 |

* cited by examiner

*Primary Examiner* — Sharad Rampuria
(74) *Attorney, Agent, or Firm* — Ware, Fressola, Van Der Sluys & Adolphson LLP

(57) ABSTRACT

A method and apparatus for providing a mobile terminal with at least one feature setting. The method comprises steps of storing at least a first check-up data in the mobile terminal; linking at least the first check-up data via a feature lock with at least one feature setting, the feature lock protecting the at least one feature setting of the mobile terminal; in response to receiving a configuration message in the mobile terminal, authenticating a sender of the configuration message with the first check-up data; and in response to the sender of the configuration message being authorized to modify the feature setting of the mobile terminal, supplying a configuration data included in the configuration message via the feature lock to be used by the mobile terminal.

25 Claims, 4 Drawing Sheets

METHOD AND APPARATUS FOR DIGITAL IMAGE PROCESSING OF AN IMAGE FROM AN IMAGE SENSOR

FIELD OF THE INVENTION

The present invention relates to customizable features of mobile terminals, and more particularly to providing an outsider with a limited access to supply configurations for these features.

BACKGROUND OF THE INVENTION

Terminals of mobile communication systems are commonly sold in a package with prepaid SIM (Subscriber Identity Module) cards, i.e. smart cards. Network operators typically offer these package deals including the mobile terminal and the prepaid smart card with a lower price than the price for separately purchasing the mobile terminal and the prepaid smart card. While subsidizing the price of the mobile terminal and thus providing a customer with an incentive for buying their mobile terminal+SIM card package, the network operators want to ensure their revenue from the usage of the mobile terminal. This is usually done with a so-called SIM lock feature, whereby the usage of the terminal with another SIM card is prevented until the customer contract expires, i.e. the prepaid SIM card has been totally debited.

Thus, the usage of the mobile terminal is limited to the services of a particular network operator. Along with the rapid development of mobile communication systems and mobile terminals, the number of various services offered in mobile networks, as well as the number of various features included in the terminals, has increased greatly. Current mobile terminals include various features, which are customizable by the terminal user: Internet browser home pages and favourite lists, various user interface settings, ringing tones, background images, etc. However, not all mobile terminal users, even though being interested in using the services, are familiar with these features or willing to spend time for searching and evaluating appropriate settings for their terminal. They could be willing to make a subscription of an update of certain feature settings fulfilling terms, which are predefined by the user. For example, the user could be willing to receive an automated update of favourite Internet links in certain fields of interest. Consequently, there exists a demand for some kind of automated update of at least a part of these customizable settings.

However, in the current mobile communication systems, there are no technical means for implementing this kind of a limited access to user customizable settings of the terminal. Currently only the user of the terminal may change the settings of these customizable features, whereby any change of the settings would require user intervention. A reason for this is that there is no secure and trusted method in the current mobile communication systems, which would prevent an unauthorized use of setting update. Furthermore, if the terminal includes a prepaid SIM, which has been locked with the SIM lock, the available supply of such services could be limited to the mobile subscriber's operator.

On the other hand, the network operator may not be willing to produce or capable of producing services supporting these features, e.g. due to lack of resources or as a deliberate business decision. Accordingly, the network operator may be willing to outsource the production of at least a part of these services to a third party. The network operator could then offer its network as a bearer service platform for the third party services, satisfy the customer demand for such automated update service (even with the SIM lock), and at the same time, gain more revenue from the third party service provider.

However, as stated above, despite the strong demand by both mobile terminal users and network operators for a service, wherein customizable features of mobile terminals could be accessed and modified, to a limited extent, by a third party, the technical shortcomings in the current mobile communication systems prevent the implementation of such a service.

SUMMARY OF THE INVENTION

Now there is invented an improved method and technical equipment implementing the method, by which it is possible to provide a third party with a limited access to supply to a mobile station some user customizable features. Various aspects of the invention include a method, an electronic device and a computer program product, which are characterized by what is stated in the independent claims. Various embodiments of the invention are disclosed in the dependent claims.

According to a first aspect, a method according to the invention is based on the idea of providing a mobile terminal with at least one feature setting, in which method at least a first check-up data is stored in the mobile terminal, and at least said first check-up data is linked via a feature lock with at least one feature setting, which feature lock protects said at least one feature setting of the mobile terminal. Then, in response to receiving a configuration message in the mobile terminal, a sender of the configuration message is authenticated with the first check-up data, and if the authentication is successful, i.e. it proves that the sender of the configuration message is authorised to modify said feature setting of the mobile terminal, a configuration data included in the configuration message is supplied via the feature lock to be used by the mobile terminal.

According to an embodiment, the modification message includes a digital signature based on a certificate of the sender of the message, whereby the sender of the message is authenticated by comparing the certificate of the sender with a certificate included in the first check-up data.

According to an embodiment, the sender of the configuration message is authenticating and the configuration data included in the configuration message is supplied via the feature lock to be used by the mobile terminal each time, when the mobile terminal starts to execute the feature protected by said feature lock.

In this embodiment, in response to authenticating the sender of the message, it is checked that the configuration message is in a predetermined format and that the configuration message includes a device identity of the mobile terminal. Then authentication data and the device identity are removed from the configuration message, and the configuration data included in the configuration message is supplied via the feature lock to be used by the mobile terminal.

According to an alternative embodiment, the sender of the configuration message is authenticating and the configuration data included in the configuration message is checked only once upon reception of the message.

In this embodiment, in response to authenticating the sender of the message, it is checked that the configuration message is in a predetermined format and that the configuration message includes a device identity of the mobile terminal. Then authentication data and the device identity are removed from the configuration message, and the configuration data included in the configuration message is supplied to be stored in a memory location in connection with the feature lock.

According to an embodiment, the mobile terminal is arranged to read the configuration data stored in the memory location first as an input for said particular feature setting. Only if any memory location includes no data, the mobile terminal is arranged to read an input for said particular feature setting from a default memory location.

According to an embodiment, the modifiable feature settings of the mobile terminal include at least one of the following: an incoming call ringing tone setting, an incoming message tone setting, a default background image, a homepage configuration setting for an Internet browser, a user interface 'theme' setting, a Java MIDlet installer setting.

According to an embodiment, at least one check-up data stored in the mobile terminal is defined as administrative check-up data, said administrative check-up data including a pair of public and secret keys and/or a certificate of an administrator. Then, in response to receiving a managing message in the mobile terminal, a sender of the message is authenticated with the administrative check-up data; and if the sender of the message is authenticated as the administrator, the check-up data and their links to said feature are modified in the mobile terminal according to a managing data included in the managing message.

The arrangement according to the invention provides significant advantages. First of all, it provides technical means by which a third party may have with a limited access to supply to a mobile terminal with some user customizable feature configurations. Secondly, due to simple authentication carried out by the feature lock and based on the secured check-up data, it is ensured that no unauthorized modifications are possible. Moreover, anyone can supply configuration messages and they can be stored almost anywhere in the memory means of mobile terminal; their validity is only checked upon authenticating the sender. Furthermore, both the mobile subscriber and the operator have incentive to agree on a deal, wherein the third party supplies the terminal of the subscriber with some customizable feature settings, while simultaneously subsidizing a part of the terminal price.

According to a second aspect, there is provided a mobile terminal arranged to provide an outsider with an access to supply at least one feature setting into the mobile terminal, the mobile terminal comprising: a first storing means for storing a plurality of check-up data; a second storing means for storing a plurality of configuration data for their respective feature settings; means for receiving a configuration message; a feature lock means for linking at least one check-up data with at least one feature setting and for authenticating a sender of the configuration message with the check-up data; wherein said feature lock means are arranged to supply, in response to the sender of the configuration message being authorised to modify the feature setting, a configuration data included in the configuration message to be used by the mobile terminal.

According to a third aspect, there is provided a computer program product, stored on a computer readable medium for execution by a processor, for providing a mobile terminal with at least one feature setting, the computer program comprising: a computer program code section for storing at least a first check-up data in the mobile terminal; a computer program code section for linking at least said first check-up data with at least one feature setting; a computer program code section, responsive to receiving a configuration message in the mobile terminal, for authenticating a sender of the configuration message with the first check-up data; and a computer program code section for supplying, in response to the sender of the configuration message being authorised to modify said setting of the feature of the mobile terminal, a configuration data included in the configuration message via the feature lock to be used by the terminal.

According to a fourth aspect, there is provided a method for allowing a third party to subsidize selling of mobile terminals, the method comprising: selling a mobile terminal including means for receiving a configuration message including a configuration data for at least one feature setting of the terminal and a signature of the sender; and means for checking up an authorisation of the sender of the configuration message to supply configuration data for said at least one feature setting of the terminal; providing the third party with a signature data required to sign configuration messages; and receiving a subsidy from the third party in response to the third party supplying configuration data for at least one feature setting to said mobile terminal.

LIST OF DRAWINGS

In the following, various embodiments of the invention will be described in more detail with reference to the appended drawings, in which FIG. 1 shows an electronic device according to an embodiment of the invention in a reduced block chart;

DESCRIPTION OF EMBODIMENTS

In the following, the invention will be illustrated by referring to methods and mobile stations according to the embodiments. A mobile station generally refers to a device comprising means for implementing wireless data transfer. Such devices include devices capable of data transfer with a public land mobile network (PLMN), such as a GSM/GPRS network or a third-generation (e.g. 3GPP) network. Data transfer can also be carried out via a wireless local area network (WLAN) or any other wireless network. For applying the invention, it is only required that the mobile station is capable of communicating with a network operator.

Figure 1:
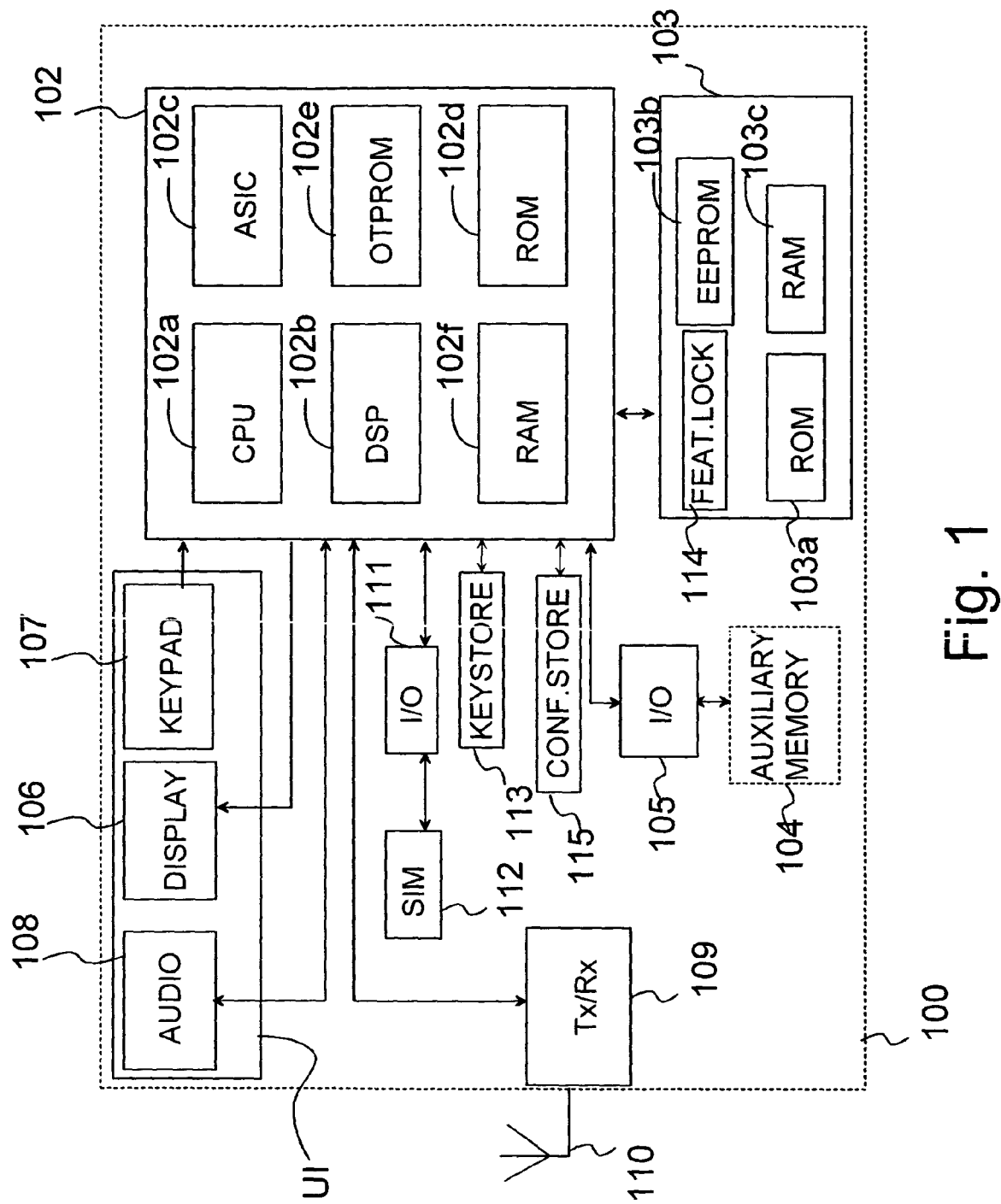

A mobile station 100 according to an embodiment of the invention, shown in FIG. 1, comprises a control block 102 containing means 102a for running programs. These means comprise, for example, a micro controller unit MCU and a digital signal processing unit DSP. In addition, the control block 102 preferably comprises an application specific integrated circuit ASIC, in which it is possible to implement, for example, at least part of the logic functions of the mobile station. Furthermore, the control block 102 of the mobile station 100 shown in FIG. 1 is preferably provided with a read-only memory 102d, of which at least a part is a one time programmable ROM (OTPROM) 102e, and a random access memory 102f. However, it is obvious that these memories 102d, 102e, 102f can also be implemented as memories separate from the control block 102.

The electronic device also comprises memory means 103 outside the control block, preferably comprising at least a read-only memory 103a, a programmable read-only memory 103b and a random access memory 103c. At least a part of the read-only memory 103a is implemented in such a way that its content cannot be changed by the user. It is also possible to connect a memory expansion to the mobile station 100 of FIG. 1, by placing a memory expansion block 104 in memory connection means 105. The memory expansion block 104 is, for example, a Flash memory card, but also other memory expansion means can be applied in connection with the invention. Preferably, the mobile station 100 is also provided with a user interface UI, which comprises a display 106, a keyboard 107, and audio means 108, such as an earpiece/a speaker and a microphone. The mobile station 100 also comprises a transceiver Tx/Rx 109 arranged to transmit and receive data transfer according to various wireless data transfer protocols through an antenna 110. Furthermore, the mobile station 100 preferably comprises means 111 for connecting an identity card 112, such as a SIM card and/or a USIM card, to the mobile station 100.

According to an embodiment, the mobile station 100 comprises a secured memory means 113 for storing various encryption/decryption keys and/or certificates, which means are referred herein as a key-storing component. The key-storing component is preferably a tamper-resistant and secret repository for a plurality of public keys, secret keys and/or certificates, which repository 113 serves as a first 'access gate' to customize some predefined features of the mobile station. The mobile station 100 further comprises a feature-lock component 114, which is a second 'access gate' to said predefined features. The feature-lock component is preferably a software executable stored in the memory means 103, but for the sake of illustration it is shown as a separate component. The feature-lock component preferably comprises a plurality of feature locks, i.e. software subroutines for various feature locks, whose operation will be further explained below. The mobile station 100 further comprises a configuration store component 115, which comprises memory locations for received configuration messages. Practically, the configuration store component 115 refers to any memory location of the mobile station, wherein configuration data can be stored. Accordingly, either of these memory components 113, 115 can be separate hardware components, but preferably they are included in one or more of the above-stated memory components. Even though no actual component is required for the implementation of these means, terms 'key-storing component' (or 'repository'), 'configuration store' and 'feature-lock component' are used herein for the sake of illustration.

It is generally known that information can be encrypted with one key, the encrypted information can be transmitted to a recipient or stored in a memory, and it can be decrypted with another key. The key used in asymmetric encryption is different from the key used in decryption. In asymmetric encryption, these keys are normally called a public key and a personal (or a secret) key. The public key is intended for encryption and the personal key is intended for decryption. It is also generally known that asymmetric keys can be used to authenticate the sender, if the sender uses his/her personal secret key for creating a signature for the message. Then the signature can be verified with the message and the corresponding public key, whereby the sender can be authenticated or at least acknowledged to be authorized to use the keys. Authorisation can also be performed by means of a certificate, for example. The certificates are digital signatures verifying a correspondence of the sender identity with a public key with greater certainty. It is notified that in the present invention, it is possible to use either of these, or any other authorisation means. It is also possible to use secret and public keys and certificates together to provide greater certainty of the sender. However, in the following the public keys and the possible certificates are generally referred to as 'check-up data' in this description.

Figure 2:
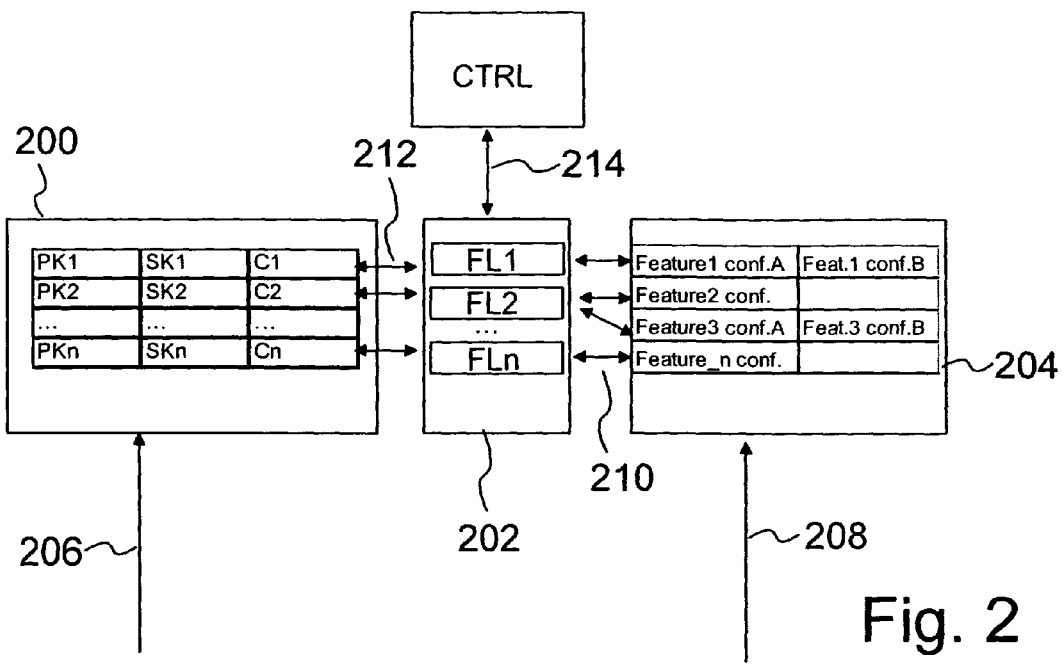
FIG. 2 shows a data structure used in a memory means according to an embodiment of the invention.

FIG. 2 illustrates more in detail how a limited access can be granted to modify these mobile station features. The key-storing component (repository) 200 includes a plurality of public keys (PK1, PK2, . . . ), secret keys (SK1, SK2, . . . ) and/or their respective certificates (C1, C2, . . . ), whereby each pair of keys and/or their respective certificate represents the check-up data for authorising an access to at least one modifiable feature. Accordingly, the first group of check-up data includes PK1 and SK1 and/or C1, the second group of check-up data includes PK2 and SK2 and/or C2, etc. Each check-up data in the repository 200 is annotated with a feature lock (FL1, FL2, . . . ) in the feature-lock component 202, whereby the feature lock is authorized to be opened with the corresponding check-up data.

The feature-lock component 202 includes preferably pre-configured settings for each feature lock FL and the associated feature. The feature locks are preferably software routines, which utilize the respective check-up data in the repository 200 to examine, whether a configuration setting is authorised to be used. Each feature lock protects one or more configurable features of the mobile station. In the example of FIG. 2, the feature lock FL1 protects the configuration settings of Feature1, the feature lock FL2 protects the configuration settings of Feature2 and Feature3, and the feature lock FLn protects the configuration settings of Feature_n.

The configuration store 204 includes one or more configuration settings for a particular feature, whereby one of the possible configuration settings can be selected as the actual setting, provided it is authorised by the respective feature lock. In the example of FIG. 2, the configuration store 204 includes two configuration settings for Feature1, i.e. Feature1 conf.A and Feature1 conf.B, and two configuration settings for Feature3 as well, i.e. Feature3 conf.A and Feature3 conf.B. However, it should be appreciated that in practical implementation the configuration store 204 is preferably not a separate memory component, like in FIG. 2, but it is a kind of a list of memory locations, wherein configuration data is stored for further processing. It is neither necessary to store the configuration settings in any particular order, like in FIG. 2, since each configuration setting can be retrieved from its own memory location.

At least one group of check-up data, i.e. one pair of keys and/or their respective certificate (e.g. PK1, SK1, C1), are defined as administrative keys, which enable an operator or a trusted third party to manage the content of the key-storing component (repository) 200. An administrator entitled to manage the keys may, for example, add, remove or replace keys in the repository 200 by sending a managing message 206 in a predetermined format, which managing message is preferably signed by the administrator. The managing message 206 sent to the mobile station is preferably detected on basis of its format and the message is directed to the key-storing component (repository) 200, wherein the sender of the message is authenticated, e.g. based on the signature C1, and it is determined whether the sender of the message is authorised to manage the content of the key-storing component.

According to an embodiment, it is also possible to use encryption, when sending the managing message. The authentication can then be carried out, for example, such that the administrator signs the managing message to be sent with its certificate (e.g. C1), and the message is encrypted using the public administrative key (PK1). When received in the repository 200, the encrypted message is decrypted with the secret administrative key (SK1), and the decrypted certificate is compared to the administrative certificate (C1) stored in repository 200; if they are equal, the managing actions defined in the managing message can be performed.

This message format can contain certificates and/or keys. A message in this format means that the contained certificates/keys are authorized to 'open' the associated set of feature locks. If the certificate already exists in the repository 200, then the managing message overwrites the list of feature locks the associated keys have access to with the provided new set of feature locks.

The administration can be managed centrally, i.e. the operator or another trusted party can manage all keys and certificates in the repository and then, according to possible service agreements with service providers, assign one or more of the keys to a service provider, which is then entitled to modify the feature(s) behind the assigned key(s). If any modifications are required to the keys and certificates in the repository, the administrator manages them centrally. Alternatively, each pair of keys and their respective certificate may be managed separately, i.e. each pair of keys is defined as an administrative key, whereby the assigned administrator (e.g. the operator or a service provider) is entitled to manage the content of the particular key(s).

The feature settings protected by the feature locks can be modified with an authorized configuration message 208, which the service provider (or the operator) assigned to configure the particular feature setting sends to the mobile station. The configuration message may a message of any suitable format, e.g. a short messaging service (SMS) message, a multimedia messaging service (MMS) message or an email including the message format, or it may be a file to be downloaded e.g. via the GPRS connection. The message should preferably be in a predetermined format, whereby the message is detected upon reception in the mobile terminal and forwarded to a memory location of the configuration store 204. The configuration message should preferably contain at least device name(s), the input for the feature setting and a signature (or a set of signatures).

The device names identify the mobile terminals, to which the configuration message is intended, and it may denote a single device, a plurality of individual devices, a range of devices or all devices subscribing the configuration service for the particular feature setting. The mobile terminals may be identified according to their international mobile equipment identity IMEI, or in a case of a prepaid SIM (whereby the SIM card should be connected to a particular mobile terminal), according to their international mobile subscriber identity IMSI, or both IMSI and IMEI. The device names may also be formed particularly for this service, e.g. calculated on the basis of IMSI and/or IMEI. Accordingly, it is obvious that any suitable format of device identity may be used herein. The configuration message may be intended for a plurality of mobile terminals belonging to the service. Thus, the message may include several individual device names or a range of device identities. The device name of the receiving mobile terminal should be included in and identified on the basis of the configuration message in order for the feature configuration procedure to continue in the mobile terminal.

The input for the feature setting includes a new configuration for the particular feature. The new configuration is defined as a file content, which may be the actual feature file (ringing tone, image file, etc.) or a setting of the feature (e.g. Internet browser's 'home page').

The sender of the configuration message (i.e. the service provider or the operator) signs the message with his/her certificate. The signature may also be a message authentication code (MAC) derived from the content of <device names, input datafile> decrypted with the secret encryption key (SK) of the sender. MAC allows the receiver to authenticate the data and verify the integrity of the configuration message.

According to an embodiment, the received configuration message is stored within the configuration store in its predetermined format. In FIG. 2, the storage is denoted by 'FeatureX conf.'. The configuration store may already contain a setting for the particular feature, whereby the received message may be stored as an alternative configuration (e.g. FeatureX conf. B). However, the naming of the configuration messages is not limited by any means and the names do not need to refer to any prioritisation (A, B, C, . . . or any other order). When a particular feature associated with a feature lock is about to be executed, the mobile terminals are arranged to first request a setting for the particular feature from the configuration store 204. If the configuration store includes a plurality of configuration messages for the particular feature, the user of the terminal may choose, which configuration message is prioritized as the first one. In response to the request, the feature-lock component downloads 210 the selected configuration message from the configuration store 204 and polls 212 the associated check-up data from the key-storing component 200 and checks the signature of the configuration message. For example, for the Feature1 in FIG. 2 the feature-lock component 202 polls the first group of check-up data (PK1, SK1 and/or C1) and based on the first group of check-up data, the feature-lock component 202 verifies the signature included in the configuration message.

Then the feature-lock component 202 checks that the configuration message format is correct and the device name of the particular mobile terminal is included in the configuration message. If affirmative, the feature-lock component 202 removes the signature and the device identities included in the configuration message, and outputs the actual content of the configuration message, i.e. the configuration for the particular feature, via an interface 214 to the control block of the mobile station for execution.

According to this embodiment, every time when a particular feature associated with a feature lock is about to be executed, the feature-lock component 202 verifies the authorisation to use the feature setting stored in configuration message by polling the associated check-up data from the key-storing component 200 and checking the signature of the configuration message. If the signature can be verified with the check-up data, the configuration included in the configuration message can be used. However, if the content of check-up data does not enable to verify the signature (e.g. due to change or removal of the associated check-up data from the key-storing component 200), then a default setting is used for the feature.

The approach of this embodiment is particularly well suited for devices based on various open platforms, like Symbian™ or Java™, wherein the principle of allowing almost any file to be modified should be respected. In this embodiment, only the key-storing component 200 cannot be modified without authorisation and still the security of the implementation is high and a possibility of abuse is minimal. If the stored configuration message file is lost or corrupted later on, a backup file can be used instead.

According to an alternative embodiment, the received configuration message and its content are checked already upon the reception of the message. Accordingly, the feature-lock component 202 immediately downloads 210 the received configuration message from the configuration store 204 and polls 212 the associated check-up data from the key-storing component 200 and checks the signature of the configuration message. If the signature authorises to continue, then the feature-lock component 202 checks that the configuration message format is correct and the device name of the particular mobile terminal is included in the configuration message. If affirmative, the feature-lock component 202 removes the signature and the device identities included in the configuration message, and outputs the actual content of the configuration message, i.e. the configuration for the particular feature. This actual feature file or a setting of the feature is then stored in a secured memory location, which may locate e.g. in connection with the feature-lock component such that the control block of the mobile station may retrieve the file via the interface 214 for execution. Also in this embodiment, a plurality of configuration settings for the particular feature may be stored in the storage, and the user of the terminal may choose, which configuration setting should be used. In this embodiment, in addition to the key-storing component, also this storage should be carefully protected.

The mobile terminals are arranged to read the content (i.e. the actual feature file or a setting of the feature) of these customizable features first from the storage of the feature-lock component 202 through the interface 214. If the feature-lock component 202 includes a setting for a particular feature, then it is used as an input for the feature. If the feature-lock component 202 includes a plurality of settings for the particular feature, the configuration setting selected by the user of the terminal is used as an input for the feature. If the feature-lock component 202 includes no setting for a particular feature, then the mobile terminal is arranged to read the content for the feature from a default memory location, situated typically in the memory means 103 of FIG. 1, and to use that as an input for the feature. Accordingly, when any customizable feature behind the feature locks FL is executed, the content of the secured memory location located in connection with the feature-lock component 202 is always checked first, and only if there is no input for the particular feature, then any other setting may be used for the feature.

According to this embodiment, the received configuration message and its content are checked only once, upon the reception of the message, after which the actual feature file or the setting of the feature is converted into a format, which is usable as such. The feature configuration can be overruled by sending a new configuration message.

Now the customizable features behind the feature locks FL would typically include any personalization feature in the mobile terminal. These may include, for example, an incoming call ringing tone setting, an incoming message tone setting, a default background image, a homepage configuration setting for the Internet browser, a user interface 'theme' setting, a Java MIDlet installer setting, etc. The features to be customized in a mobile terminal would preferably be agreed with the subscriber of the terminal and the operator.

The operator may offer a third party (a service provider) to be the sole supplier for ringing tones, background images, configuration settings, etc. for the mobile terminal. This would create interest in the third party to subsidize a part of a phone, whereby the operator may, in turn, offer their package deal of a mobile terminal and a prepaid SIM card with lower price. Thus, by agreeing with the operator and the third party on a deal, wherein the third party supplies the terminal of the subscriber with some customizable feature settings, the subscriber would receive, besides the desired feature settings for his/her terminal, also his/her terminal equipment or telephone services more advantageously. Accordingly, the arrangement described above provides advantages for both the mobile subscriber and the operator.

The delivery of the feature configuration settings to the mobile terminal may be based on a "push service" or a "pull service". In a push service, the service provider sends configuration messages to the terminals in accordance with the terms of the service agreement. This could happen on regular intervals, e.g. twice in a month, or based on a certain event, e.g. an update in a file content. In a pull service, the user of the terminal sends a service request to the service provider, e.g. an order for a new ringing tone, and then the service provider sends a new configuration message including the requested feature setting. Naturally, the service agreement may allow both push and pull services for a particular terminal.

Accordingly, from the operator's or the retail seller's point of view, an aspect of the invention is a method for allowing a third party to subsidize selling of mobile terminals. Consequently, when the operator or the retail seller sells a mobile terminal, the terminal should include at least means for receiving a configuration message described above and means for checking up (i.e. check-up data in the key-storing component and a feature lock linked to the check-up data) an authorisation of the sender of the configuration message to supply configuration data for a feature setting of the terminal. Then the operator or the retail seller provides the third party with a signature data required to sign configuration messages, which allows the third party thereafter to send correctly signed configuration messages to the mobile terminal according to the terms of the service agreement. Naturally the terms of the service agreement also define how the third party pays the subsidies in exchange for being allowed to supply configuration data to said mobile terminal. The subsidy may be e.g. a once-time payment, a monthly payment or it may be a per-configuration message payment.

For digital signatures, various methods may be used, such as the RSA, Digital Signatures Algorithm (DSA), and Elliptic Curve Cryptography (ECC). In connection with these methods, compression algorithms for the information to be signed are used, including Secure Hash Algorithm (SHA-1) and Message Digest 5 (MD5) to be mentioned in this context.

Figure 3:
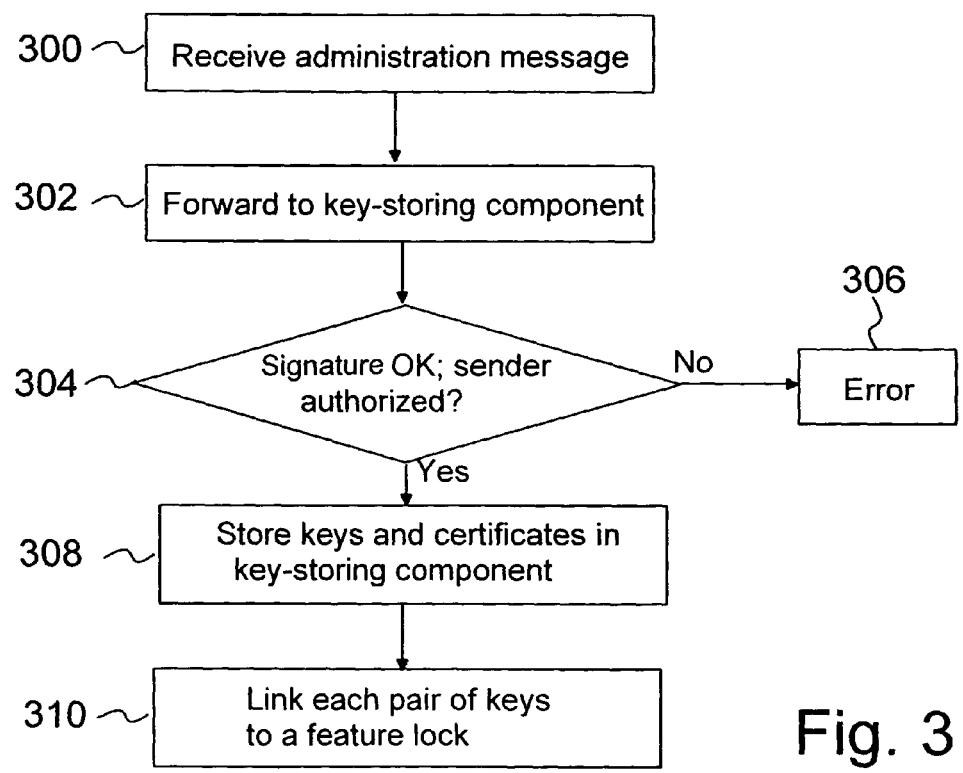
FIG. 3 shows a flow chart of a feature lock configuration method in a mobile terminal according to an embodiment of the FIG. 4 shows a flow chart of a feature setting configuration method in a mobile terminal according to an embodiment of the invention.

FIG. 3 shows a flow chart of a feature lock configuration method in a mobile terminal according to an embodiment of the invention. The starting point of the method of FIG. 3 is that at least one pair of keys and/or a respective certificate are stored in the key-storing component and predefined as administrative keys. The definition of the administrative keys may be carried out e.g. by the operator or a retail seller at the time of the purchase of the terminal, whereby the operator or a trusted third party is enabled to manage the content of the key-storing component.

Now, an administration message is received in the mobile station (300), which message includes one or more pairs of public and secret keys and/or respective certificates, and administrative instructions to annotate each pair of the keys and/or each certificates to at least one feature lock of the feature lock component. The administration message detected upon reception and forwarded (302) to the key-storing component for signature checking. The sender of the message is authenticated (304) e.g. by comparing the certificate the administration message to the administrative certificate stored in the key-storing component. If the sender of the administration message cannot be authorised, i.e. authenticated as an administrator, an error message is transmitted back to the sender (306) and no further actions are performed.

However, if the authorisation is successful, the one or more pairs of public and secret keys and/or the respective certificates included in the administration message are stored in the key-storing component (308). Then each pair of the keys is linked to at least one feature lock of the feature lock component (310) according to the instruction included in the administration message.

Figure 4:
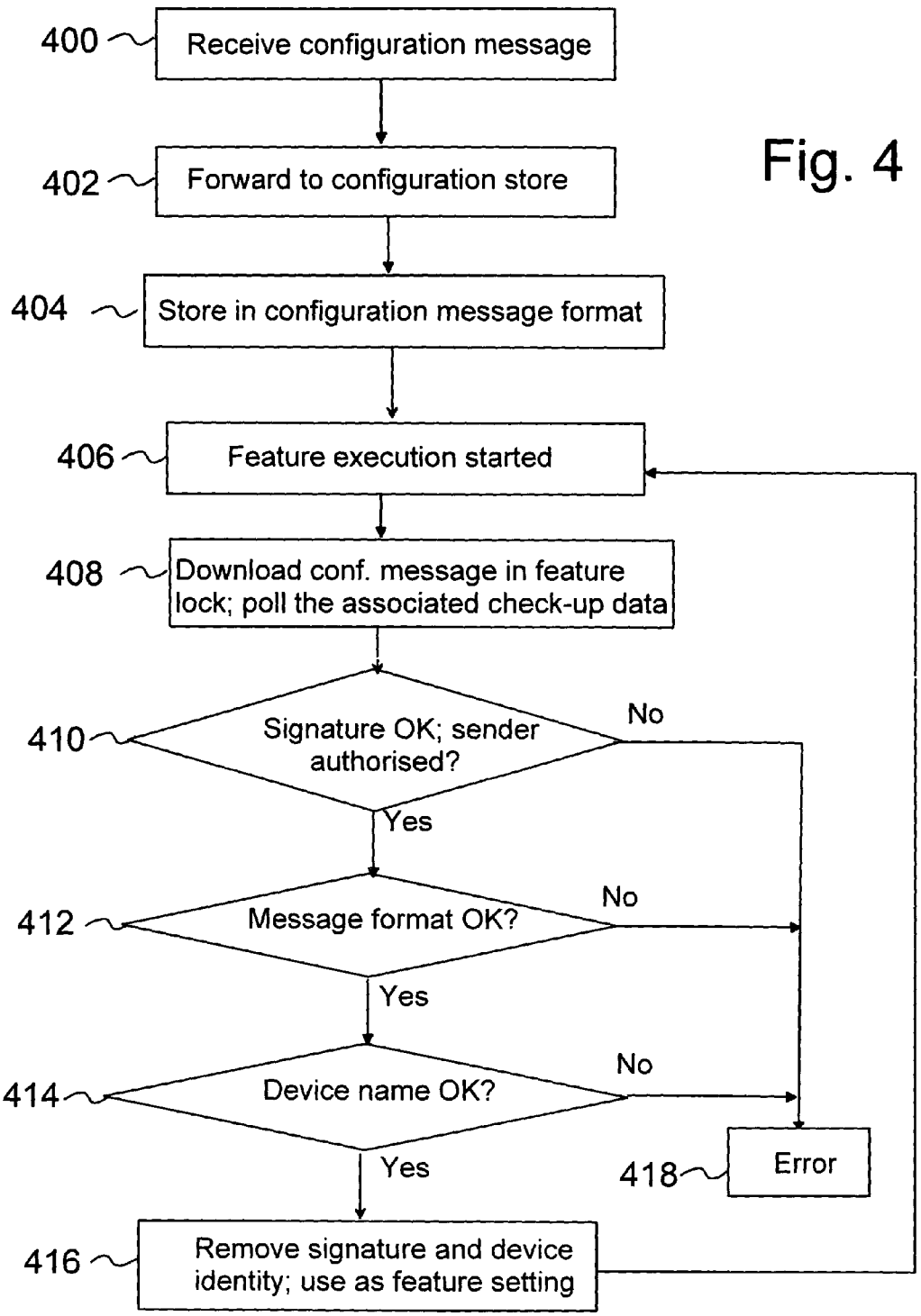

When the necessary public and secret keys and the possible certificates and the respective feature locks have been configured, it is possible to modify the feature settings behind the feature locks. FIG. 4 shows a flow chart of a feature setting configuration method in a mobile terminal according to an embodiment of the invention.

First, a configuration message is received in the mobile station (400). The configuration message detected upon reception and forwarded (402) to the configuration store and stored within it (404). In this example it is presumed that the received configuration message is the sole configuration message stored in the configuration store for this particular feature such that no user prioritisation is needed. Then, in response to starting an execution of a particular feature associated with a feature lock (406), feature-lock component downloads the configuration message from the configuration store and polls (408) the associated check-up data from the key-storing component, and the sender of the message is authenticated (410) e.g. by comparing certificates. If the sender of the message cannot be authenticated, an error message is transmitted back to the sender (418).

If the sender of the message is authorised to set a new configuration for the feature, the particular feature lock checks whether the configuration message is in a predetermined format (412). Furthermore, it is checked that the device name of the particular mobile terminal is included in the configuration message (414). Then, if both of these steps (412, 414) are carried out successfully, the signature and the device identities included in the configuration message are removed and the data content of the configuration message is output to be used this time as the configuration for the particular feature (416). However, if either of these steps (412, 414) fails, i.e. the message format is not correct or the device name cannot be identified, an error message is transmitted to the sender of the configuration message (418). Thereafter, the feature-lock component is looped back to wait for the start of the next execution of the particular feature associated with the feature lock (406).

Figure 5:
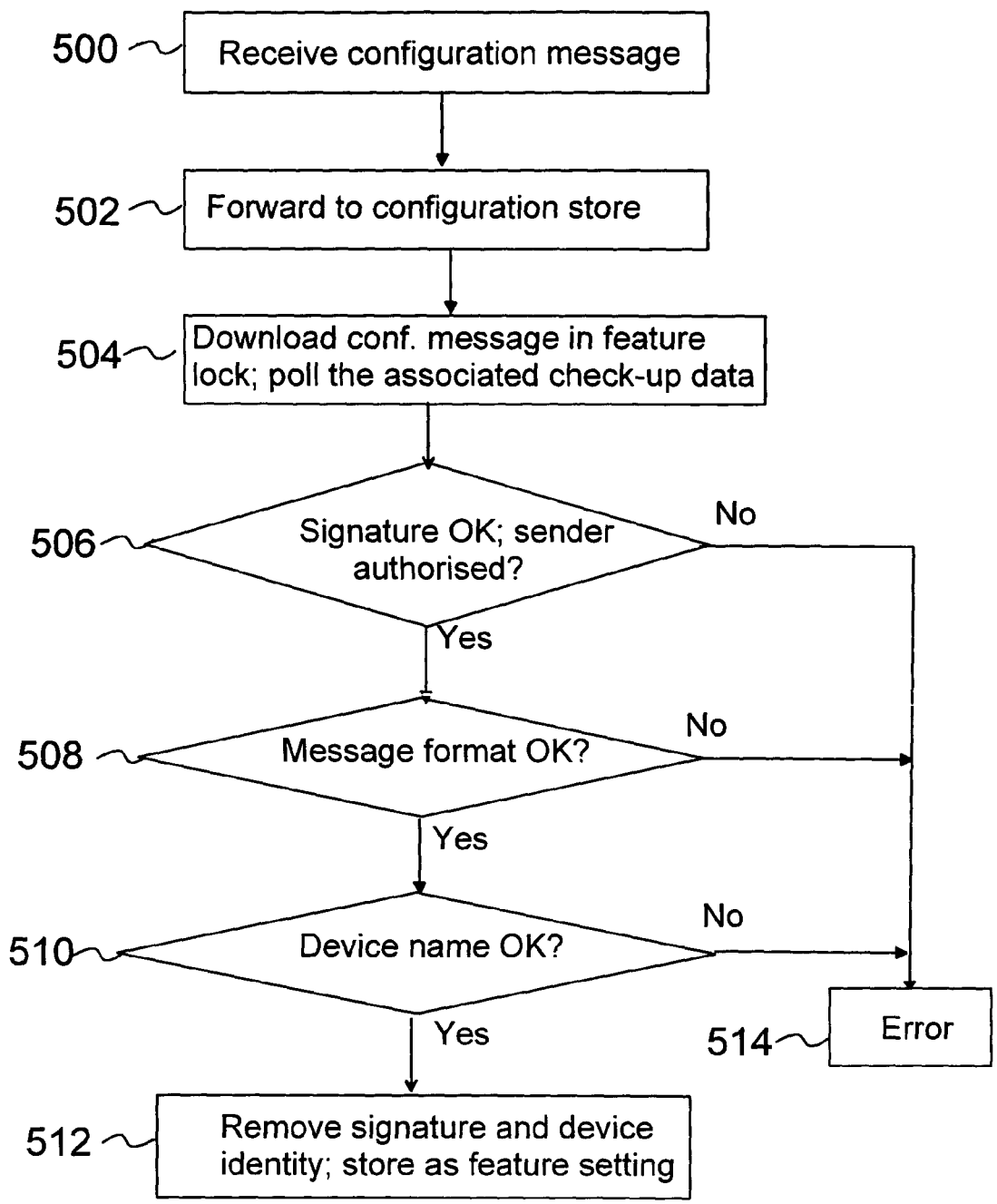
FIG. 5 shows a flow chart of a feature setting configuration method in a mobile terminal according to another embodiment of the invention.

FIG. 5 shows a flow chart of a feature setting configuration method in a mobile terminal according to another embodiment of the invention.

First, a configuration message is received in the mobile station (500). The configuration message detected upon reception and forwarded (502) to the configuration store for checking the signature. The feature-lock component downloads the configuration message from the configuration store and polls (504) the associated check-up data from the key-storing component, and the sender of the message is authenticated (506) e.g. by comparing certificates. If the sender of the message cannot be authenticated, an error message is transmitted back to the sender (514).

If the sender of the message is authorised to modify the feature, the particular feature lock checks whether the configuration message is in a predetermined format (508). Furthermore, it is checked that the device name of the particular mobile terminal is included in the configuration message (510). Then, if both of these steps (508, 510) are carried out successfully, the signature and the device identities included in the configuration message are removed and the data content of the configuration message is stored as the new configuration for the particular feature (512). However, if either of these steps (508, 510) fails, i.e. the message format is not correct or the device name cannot be identified, an error message is transmitted to the sender of the configuration message (514).

The steps according to the embodiments can be largely implemented with program commands of the software running means 2a in the control block 2 of the electronic device 1. Thus, said means for carrying out the feature setting configuration method described above are typically implemented as computer software code. The computer software may be stored into any memory means, such as the hard disk of a PC or a CD-ROM disc, from where it can be loaded into the memory of mobile terminal. The computer software can also be loaded through a network, for instance using a TCP/IP protocol stack. It is also possible to use hardware solutions or a combination of hardware and software solutions for implementing the inventive means.

It is obvious that the present invention is not limited solely to the above-presented embodiments, but it can be modified within the scope of the appended claims.

What is claimed is:

1. A method for providing a mobile terminal with at least one feature setting, the method comprising:
   storing at least a first check-up data in the mobile terminal;
   linking at least said first check-up data via a feature lock with at least one feature setting, said feature lock protecting said at least one feature setting of the mobile terminal;
   in response to receiving a configuration message in the mobile terminal, authenticating a sender of the configuration message with the first check-up data in said mobile terminal; and
   in response to the sender of the configuration message being authorized to modify said feature setting of the mobile terminal, supplying a configuration data included in the configuration message via the feature lock to be used by the mobile terminal each time, when the mobile terminal starts to execute the feature protected by said feature lock.

2. The method according to claim 1, wherein the configuration message includes a digital signature based on a certificate of the sender of the message, the method further comprising:
   authenticating the sender of the configuration message by comparing the certificate of the sender with a certificate included in the first check-up data.

3. The method according to claim 1, the method further comprising:
   carrying out said step of authenticating the sender of the configuration message each time, when the mobile terminal starts to execute the feature protected by said feature lock.

4. The method according to claim 3, the method further comprising:
   in response to authenticating the sender of the message, checking that the configuration message is in a predetermined format and that the configuration message includes a device identity of the mobile terminal.

5. The method according to claim 4, the method further comprising:
   removing authentication data and the device identity from the configuration message; and
   supplying the configuration data included in the configuration message via the feature lock to be used by the mobile terminal.

6. The method according to claim 1, the method further comprising:
in response to authenticating the sender of the message, checking that the configuration message is in a predetermined format and that the configuration message includes a device identity of the mobile terminal.

7. The method according to claim 6, the method further comprising: removing authentication data and the device identity from the configuration message; and supplying the configuration data included in the configuration message to be stored in a memory location in connection with the feature lock.

8. The method according to claim 7, the method further comprising:
arranging the mobile terminal to read the configuration data stored in the memory location first as an input for said particular feature setting.

9. The method according to claim 8, the method further comprising:
in response to any memory location including no configuration data for said particular feature setting, arranging the mobile terminal to read an input for said particular feature setting from a default memory location.

10. The method according to claim 1, wherein the feature settings of the mobile terminal include at least one of the following:
an incoming call ringing tone setting,
an incoming message tone setting,
a default background image,
a homepage configuration setting for an Internet browser,
a user interface 'theme' setting,
a Java MIDlet installer setting.

11. The method according to claim 1, the method further comprising:
defining at least one check-up data stored in the mobile terminal as administrative check-up data, said administrative check-up data including a pair of public and secret keys and/or a certificate of an administrator.

12. The method according to claim 11, the method further comprising:
in response to receiving a managing message in the mobile terminal, authenticating a sender of the message with the administrative check-up data; and
in response to the sender of the message being authenticated as the administrator, modifying the check-up data and their links to said feature in the mobile terminal according to a managing data included in the managing message.

13. A mobile terminal for providing an outsider with an access to supply at least one feature setting into the mobile terminal, the mobile terminal comprising:
a first memory for storing a plurality of check-up data;
a second memory for storing a plurality of configuration data for their respective feature settings;
a receiver for receiving a configuration message; and
a feature lock for linking at least one check-up data with at least one feature setting and for authenticating a sender of the configuration message with the check-up data in said mobile terminal; wherein
said feature lock arranged to supply, in response to the sender of the configuration message being authorized to modify the feature setting, a configuration data included in the configuration message to be used by the mobile terminal each time, when the mobile terminal starts to execute the feature protected by said feature lock.

14. The mobile terminal according to claim 13, wherein the first memory comprises a tamper-resistant repository for storing a plurality of pairs of public and secret keys and/or related certificates.

15. The mobile terminal according to claim 14, wherein said feature lock is arranged to compare a certificate of the sender with a certificate included in the first storing means.

16. The mobile terminal according to claim 13, wherein the mobile terminal is arranged to
authenticate the sender of the configuration message each time, when an execution of the feature protected by said feature lock is started.

17. The mobile terminal according to claim 16, wherein the feature lock is arranged to
check that the configuration message is in a predetermined format and that the configuration message includes a device identity of the mobile terminal.

18. The mobile terminal according to claim 17, wherein the feature lock is arranged to
remove authentication data and the device identity from the configuration message before supplying the configuration data to be used by the mobile terminal.

19. The mobile terminal according to claim 13, wherein the feature lock is arranged to
check that the configuration message is in a predetermined format and that the configuration message includes a device identity of the mobile terminal.

20. The mobile terminal according to claim 19, wherein the feature lock is arranged to
remove authentication data and the device identity from the configuration message; and
store the configuration data included in the configuration message for further usage.

21. The mobile terminal according to claim 13, wherein the feature lock further comprises:
an interface for arranging the mobile terminal to read said configuration data of the feature setting first as an input for said particular feature setting.

22. The mobile terminal according to claim 21, wherein the mobile terminal is arranged to read an input for said particular feature setting from a default memory location, if any memory location in connection with the feature lock includes no configuration data for said particular feature setting.

23. The mobile terminal according to claim 13, wherein the feature settings of the mobile terminal include at least one of the following:
an incoming call ringing tone setting,
an incoming message tone setting,
a default background image,
a homepage configuration setting for an Internet browser,
a user interface 'theme' setting,
a Java MIDlet installer setting.

24. A computer readable medium stored with a computer program for execution on a processor, which when executed by said processor is for providing a mobile terminal with at least one feature setting, the computer program comprising:
a computer program code section for storing at least a first check-up data in the mobile terminal;
a computer program code section for linking at least said first check-up data with at least one feature setting,
a computer program code section, responsive to receiving a configuration message in the mobile terminal, for authenticating a sender of the configuration message with the first check-up data in said mobile terminal; and
a computer program code section for supplying, in response to the sender of the configuration message being authorized to modify said setting of the feature of the mobile terminal, a configuration data included in the configuration message via the feature lock to be used by the terminal each time, when the mobile terminal starts to execute the feature protected by said feature lock.

25. A method for allowing a third party to subsidize selling of mobile terminals, the method comprising:

selling a mobile terminal including a receiver for receiving a configuration message including a configuration data for at least one feature setting of the terminal and a signature of the sender; and a processor for checking up an authorization of the sender of the configuration message to supply configuration data for said at least one feature setting of the terminal;

providing the third party with a signature data required to sign configuration messages; and receiving a subsidy from the third party in response to the third party supplying configuration data for at least one feature setting to said mobile terminal each time, when the mobile terminal starts to execute the feature protected by said feature lock.

* * * * *